३,३५९,३३७
DIENE OLIGOMERIZATION
Edward A. Rick, Charleston, W. Va., assignor to Union
Carbide Corporation, a corporation of New York
No Drawing. Filed June 11, 1965, Ser. No. 463,384
18 Claims. (Cl. 260—666)

This invention relates to a method for the oligomerization of conjugated dienes and to a catalyst therefore. More particularly this invention is concerned with a novel catalyst and process for the dimerization of butadiene.

It has been found by this invention that butadiene can be oligomerized in etheric solution in the presence of catalytic amounts of a catalyst prepared from a nickel halide and a Grignard reagent to produce a mixture comprising predominantly the butadiene dimers 3-methyl-1,5-heptadiene, 2,6-octadiene, and 1,3,5-cyclooctatriene. In addition, there is also produced a minor amount of trimers corresponding to the formula $C_{12}H_{16}$.

Conditions of temperature and pressure are not highly critical to this invention. For example, the oligomerization can be effected at temperatures above or below room temperature (20–25° C.). Elevated temperatures, i.e., temperatures in excess of room temperature, are generally necessary, however, to achieve practical reaction rates, with temperatures above about 50° C. being preferred. It is also preferable to maintain temperatures of less than about 150° C., the temperature at which the thermal dimerization of butadiene to vinylcyclohexene becomes an important competing reaction. Temperatures of less than about 130° C. are especially preferred.

Pressure is likewise not critical, and sub- or super-atmospheric pressures can be used, with autogenous pressures being generally employed.

The reaction time is not critical, and can vary from a few minutes up to several hours or even days if desired.

The catalyst system employed in the process of this invention is produced by admixing a nickel halide with at least 2 moles of Grignard reagent per mole of nickel halide in an etheric medium. Molar ratios of at least 2.5:1 are preferred. The maximum molar ratio is not narrowly critical, however, and can be as high as 10:1 or even higher.

The nickel halides which can be employed in accordance with this invention are represented by the formula $NiX_2$ wherein X is a halogen having an atomic number of from 17 to 53, inclusive, i.e., nickel chloride, nickel bromide and nickel iodide. Nickel bromide is preferred.

Grignard reagents which are employed in accordance with this invention are represented by the formula RMgX wherein R is a hydrocarbyl radical and X is a halogen as defined above. By the term "hydrocarbyl radical" is meant a monovalent hydrocarbon radical which may be saturated or unsaturated, aliphatic or aromatic, cyclic or acyclic in nature. It is essential, however, that the hydrocarbyl radical contains no aliphatic unsaturation, i.e., an olefinic double bond or an acetylenic double bond, between the carbon atoms $\beta$- and $\gamma$- to the MgX group. Thus, the hydrocarbyl radical cannot be, for example, allyl or 1-indenyl. Illustrative of suitable hydrocarbyl radicals are alkyl radicals such as methyl, ethyl, n-butyl, t-butyl, decyl, eicosyl and the like; alkenyl such as butenyl, hexenyl free from $\beta$, $\gamma$, unsaturation, as above, and the like; alkynyl, such as butynyl and the like, cycloalkyl such as cyclopentyl, cyclohexyl, bicycloheptyl and the like; aryl such as phenyl, naphthyl, and the like; aralkyl such as benzyl, phenethyl and the like; alkaryl such as tolyl, xylyl, mesityl and the like; et cetera. It is generally preferred that the hydrocarbyl radical contain less than about 20 carbons, with those containing less than about 10 carbons being especially preferred.

The catalyst is prepared by admixing the components in a normally-liquid etheric medium, i.e., in a medium comprising an ether which is liquid at room temperature and pressure. Ethers which can be employed are those generally employed in Grignard preparations, and, thus, are known to those of ordinary skill in the art. These ethers are generally cyclic or acyclic ethers consisting solely of carbon, hydrogen and oxygen, wherein the oxygen is present only in the form of an ether linkage. Illustrative of applicable ethers are diethyl ether, diisopropyl ether, di-n-butyl ether, diamyl ether, methylal, tetrahydrofuran, anisole, and phenetole. The amount of ether is not highly critical, provided the catalyst components are retained in solution. In general, however, amounts of about 1 to about 10 liters of solvent per mole of nickel halide are generally employed.

Without wishing to be bound to any particular theory, it is believed that the active catalyst comprises nickel in the zero valent state. Accordingly, it is preferred that the etheric medium contain an aliphatic dienic hydrocarbon, such as 1,3-butadiene or 1,5-cyclooctadiene, to complex with the nickel and retain it in solution. A particularly preferred technique for preparation of the catalyst comprises admixing the nickel halide and Grignard reagent in an etheric medium which is saturated with butadiene.

The conditions of temperature and pressure for the preparation of the catalyst are not highly critical, and room temperature and pressure are suitable. Higher or lower temperatures and pressures can be employed, if desired.

The catalyst can be prepared prior to its use for effecting the oligomerization of this invention, or the catalyst components, including ether solvent, can be charged directly to the oligomerization.

The catalytic amount of catalyst is not highly critical to this invention, and the molar ratio of nickel halide to butadiene can vary from about 0.0001:1 or lower to about 0.01:1 or higher.

The products of the oligomerization are recovered by conventional techniques, such as distillation, extraction, and the like.

The following examples are illustrative.

*Example 1*

A flask fitted with a stirrer, dropping funnel, thermometer, condenser, and gas inlet tube was charged with 0.08 mole of anhydrous nickel bromide and 200 milliliters of tetrahydrofuran. The resulting slurry was saturated with butadiene, and a solution of 0.48 mole of phenylmagnesium bromide in 230 milliliters of tetrahydrofuran was added over 4 hours while maintaining the reaction mixture at 20° C. with stirring. Butadiene was fed continuously during this period to keep the reaction mixture saturated, and a total of 100 grams was absorbed by the reaction mixture during this period.

After standing overnight at room temperature, the reaction mixture, together with 291 grams of butadiene, was charged to a 3-liter bomb, and then heated at 60° C., with shaking, for 18 hours, over which period a marked decrease in pressure was observed.

The reaction product was then distilled to recover several cuts, each of which was analyzed by vapor phase chromatography. These cuts were found to contain a total of 58 grams of 3-methyl-1,5-heptadiene, 41 grams of 1,3,5-cyclooctatriene, and 44 grams of $C_{12}H_{16}$ hydrocarbons.

*Examples 2–4*

Employing similar techniques, several additional experiments were carried out. The data for these examples are summarized in Table I, with the data for the above-described Example 1 being included for purposes of comparison.

TABLE I

| Example No. | 1 | 2 | 3 | 4 |
|---|---|---|---|---|
| Catalyst Preparation: | | | | |
| Charge: | | | | |
| $NiBr_2$, moles | 0.08 | 0.08 | 0.08 | 0.08 |
| Tetrahydrofuran, ml | 200 | 200 | 200 | 200 |
| Added: | | | | |
| RMgBr: | | | | |
| R | Phenyl | Phenyl | Mesityl | p-Tolyl |
| Moles | 0.48 | 0.16 | 0.48 | 0.48 |
| Tetrahydrofuran, ml | 220 | 220 | 220 | 220 |
| Butadiene absorbed, gm | 100 | 120 | 23 | 152 |
| Oligomerization Reaction: Butadiene charged, gm | 291 | 285 | 286 | 283 |
| Product: | | | | |
| 3-methyl-1,5-heptadiene, gm | 58 | 6.3 | 31 | 43 |
| 2,6-octadiene, gm | ---- | 8.6 | 42 | 60 |
| 1,3,5-cyclooctatriene, gm | 41 | 3 | 19 | 26 |
| $C_{12}H_{18}$ Hydrocarbons, gm | 44 | 5.9 | 31 | 31 |

Example 5

A solution of 0.025 mole of phenylmagnesium bromide, 0.0042 mole of nickel bromide and 33 grams of butadiene in 17.5 milliliters of tetrahydrofuran was charged to a heavy-walled glass tube. The tube was sealed and heated at 60° C. for 21.25 hours. The tube was opened and heated to remove 1 gram of unreacted butadiene. Flash distillation of the residue yielded 30 grams of distillate. Analysis of the distillate by vapor phase chromatography established the presence of 3-methyl-1,5-heptadiene, 2,6-octadiene and 1,3,5-cyclooctatriene in molar ratios of 1:1.3:1.

Example 6

Employing techniques similar to those described in Example 5, except that 0.35 mole of n-butylmagnesium bromide was substituted for the phenylmagnesium bromide, 3-methyl-1,5-heptadiene, 2,6-octadiene and 1,3,5-cyclooctatriene were produced in a molar ratio of 1.1:1.5:1.

What is claimed is:

1. The process for producing predominantly the butadiene oligomers 3-methyl-1,5-heptadiene, 2,6-octadiene and 1,3,5-cyclooctatriene which consists essentially of contacting butadiene with a catalytic amount of the product obtained by admixing a nickel halide of the formula $NiX_2$ with a Grignard reagent of the formula RMgX, wherein X is a halogen having an atomic number of from 17 to 53, inclusive; and R is a hydrocarbyl radical of less than 20 carbons free from $\beta,\gamma$-aliphatic unsaturation, in as a solvent a normally-liquid ether consisting solely of carbon, hydrogen and oxygen, said oxygen being present solely in the form of an ether linkage, and wherein the molar ratio of said Grignard reagent to said nickel halide is at least 2:1.

2. The process for producing predominantly the butadiene oligomers 3-methyl-1,5-heptadiene, 2,6-octadiene and 1,3,5-cyclooctatriene which consists essentially of heating butadiene at about 50° C. to about 130° C. in contact with a catalytic amount of the product obtained by admixing a nickel halide of the formula $NiX_2$ with a Grignard reagent of the formula RMgX, wherein X is a halogen having an atomic number of from 17 to 53, inclusive; and R is a hydrocarbyl radical of less than 20 carbons free from $\beta,\gamma$-aliphatic unsaturation, in as a solvent a normally-liquid ether consisting solely of carbon, hydrogen, and oxygen, said oxygen being present solely in the form of an ether linkage, and wherein the molar ratio of said Grignard reagent to said nickel halide is at least 2:1.

3. The process for producing predominantly the butadiene oligomers 3-methyl-1,5-heptadiene, 2,6-octadiene, and 1,3,5-cyclooctatriene which consists essentially of heating butadiene at about 50° C. to about 130° C. in contact with a catalytic amount of the product obtained by admixing nickel bromide with a Grignard reagent of the formula RMgBr, wherein R is a hydrocarbyl radical of less than 10 carbons free from $\beta,\gamma$-aliphatic unsaturation, in as a solvent a normally-liquid ether consisting solely of carbon, hydrogen and oxygen, said oxygen being present solely in the form of an ether linkage, and wherein the molar ratio of said Grignard reagent to said nickel halide is at least 2:1.

4. The process for producing predominantly the butadiene oligomers 3-methyl-1,5-heptadiene, 2,6-octadiene and 1,3,5-cyclooctatriene which consists essentially of heating butadiene at about 50° C. to about 130° C. in contact with a catalytic amount of the product obtained by admixing nickel bromide with a Grignard reagent of the formula RMgBr, wherein R is a hydrocarbyl radical of less than 10 carbons free from $\beta,\gamma$-aliphatic unsaturation, in as a solvent a normally-liquid ether consisting solely of carbon, hydrogen and oxygen, said oxygen being present solely in the form of an ether linkage, and wherein the molar ratio of said Grignard reagent to said nickel bromide is from about 2.5:1 to about 10:1.

5. The process as claimed in claim 4 wherein said Grignard reagent is an alkyl magnesium bromide.

6. The process as claimed in claim 5 wherein said Grignard reagent is butyl magnesium bromide.

7. The process as claimed in claim 4 wherein said Grignard reagent is an aryl magnesium bromide.

8. The process as claimed in claim 7 wherein said Grignard reagent is a phenyl magnesium bromide.

9. The process as claimed in claim 7 wherein said Grignard reagent is a tolyl magnesium bromide.

10. The process as claimed in claim 7 wherein said Grignard reagent is a mesityl magnesium bromide.

11. A catalyst prepared by admixing a nickel halide of the formula $NiX_2$ with a Grignard reagent of the formula RMgX, wherein X is a halogen having an atomic number of from 17 to 53, inclusive; and R is a hydrocarbyl radical of less than 20 carbons free from $\beta,\gamma$-aliphatic unsaturation, in as a solvent a normally-liquid ether consisting solely of carbon, hydrogen, and oxygen, said oxygen being present solely in the form of an ether linkage, said ether being saturated with butadiene, and wherein the molar ratio of said Grignard reagent to said nickel halide is at least 2:1.

12. A catalyst prepared by admixing nickel bromide with a Grignard reagent of the formula RMgBr, wherein R is a hydrocarbyl radical of less than 10 carbons free from $\beta,\gamma$-aliphatic unsaturation, in as a solvent a normally-liquid ether consisting solely of carbon, hydrogen, and oxygen, said oxygen being present solely in the form of an ether linkage, said ether being saturated with butadiene, and wherein the molar ratio of said Grignard reagent to said nickel halide is from about 2.5:1 to about 10:1.

13. The catalyst as claimed in claim 12 wherein said Grignard reagent is an alkyl magnesium bromide.

14. The catalyst as claimed in claim 13 wherein said Grignard reagent is butyl magnesium bromide.

15. The catalyst as claimed in claim 12 wherein said Grignard reagent is an aryl magnesium bromide.

16. The catalyst as claimed in claim 12 wherein said Grignard reagent is a phenyl magnesium bromide.

17. The catalyst as claimed in claim 12 wherein said Grignard reagent is a tolyl magnesium bromide.

18. The catalyst as claimed in claim 12 wherein said Grignard reagent is a mesityl magnesium bromide.

References Cited

FOREIGN PATENTS 1,140,569  12/1962  Germany.

OTHER REFERENCES

V. D. Parker et al.: "J. Amer. Chem. Soc.", Vol. 86, pp. 1110–1112, Mar. 20, 1964.

PAUL M. COUGHLAN, JR., *Primary Examiner.*

DELBERT E. GANTZ, *Examiner.*

V. O'KEEFE, *Assistant Examiner.*